United States Patent [19]
Anderson

[11] 4,368,637
[45] Jan. 18, 1983

[54] VIBRATION SENSING DEVICE

[76] Inventor: Francis J. Anderson, 68 Allen Park Rd., Stillorgan, County Dublin, Ireland

[21] Appl. No.: 176,888

[22] Filed: Aug. 11, 1980

[30] Foreign Application Priority Data

Aug. 14, 1979 [IE] Ireland .............................. 1560/79

[51] Int. Cl.³ .......................................... H01H 35/14
[52] U.S. Cl. .................................. 73/652; 200/61.45 R
[58] Field of Search ................... 73/652; 200/61.45 R, 200/61.52, 61.93; 340/541, 566

[56] References Cited

U.S. PATENT DOCUMENTS

| | | | |
|---|---|---|---|
| 3,862,386 | 1/1975 | Hall | 73/652 |
| 4,155,067 | 5/1979 | Gleeson | 200/61.52 |
| 4,185,180 | 1/1980 | Anderson | 200/61.45 R |

FOREIGN PATENT DOCUMENTS

1263076 2/1972 United Kingdom ................. 73/652

*Primary Examiner*—Stephen A. Kreitman
*Attorney, Agent, or Firm*—Ladas & Parry

[57] ABSTRACT

A vibration sensing device comprising a vibration sensor forming part of an electrical circuit suspended by a pendulous support provided by a pair of electrically conductive suspension plates. The vibration sensor comprises an electrically conductive inertia mass supported on supports in the suspension plates. The combined inertia of the sensor and the suspension plates is such that high energy vibrations cause the suspension plates and the sensor to oscillate, while low energy vibrations do not. Accordingly, only low energy vibrations cause the inertia mass to lift off the supports to open and close the electrical circuit. Thereby the vibration sensing device is only responsive to low energy vibrations.

29 Claims, 27 Drawing Figures

Fig.11h

VIBRATION SENSING DEVICE

BACKGROUND OF THE INVENTION

1. Field of the Invention

The present invention relates to a vibration sensing device for mounting on a building, structure, machine or the like to detect vibrations.

2. Description of Prior Art

Vibration sensing devices, often called inertia sensing devices or accelerometers are now used extensively for many operations. For example, they are used in security equipment for buildings and the like and in safety equipment for machinery and the like. These vibration sensing devices are switches operated by movement of the switch as a whole under the influence of an accelerating force, for example, any vibration, impact or the like.

Further, such vibration sensing devices are particularly useful for mounting on domestic appliances, for example, washing machines and spin dryers so that when such machines are subjected to excessive vibrations due to over or eccentric loading of the drum, the vibration sensing device can be used as a switch to cut off the supply of electricity. Similarly, such vibration sensing devices may be used to disconnect the electrical system of a vehicle, for example, in the event of a crash or can be used as a security device in the event of unauthorised interference with the vehicle.

These vibration sensing devices, in general, are frequency sensitive and may be of the type which include at least two members which form part of an electrical circuit. Vibration of the device causes the members to move relative to each other to open or close the electric circuit. More usually, vibration sensing devices comprise an electrically conductive inertia mass supported on a pair of spaced apart electrically conductive support members which together form part of the electrical circuit. Vibration of these devices causes the inertia mass to move off the support members, thereby opening the electrical circuit. These vibration sensing devices are connected to analysing apparatus and being frequency sensitive, give a frequency response dependant on the vibration to which the device is subjected to. The analysing apparatus analyses the response, and depending on the response, for example, may activate an alarm or open a switch.

It is important that security and safety equipment of this type is sufficiently sensitive to distinguish between vibrations in a building, structure or machine caused by natural phenomenon and those caused by an attempted break-in to a building or structure or the iminent distruction of a machine. Vibrations caused by natural phenomenon are, for example, those caused by traffic, environmental conditions such as storms or birds flying against a window or fence. In general, vibrations caused by attempted break-ins are caused by sawing, cutting glass, chiseling putty or a window breaking. It has been found that vibrations caused by natural phenomenon, are in general of high amplitude low frequency, in other words high energy vibrations. While vibrations caused by an attempted break-in for example are usually of high frequency low amplitude, in other words low energy vibrations.

Unfortunately, with present security and safety equipment, in order to avoid false alarms it is essential to use relatively complex, and in turn expensive analysing apparatus to adequately analyse the frequency response from the vibration sensing device. This is mainly because of the relatively low sensitivity of some vibration sensing devices. Attempts have been made to overcome this problem by providing vibration sensing devices of relatively high sensitivity. One example of such a device is disclosed in U.S. Pat. No. 4,185,180. In this device aninertia mass is provided by an electrically conductive bar supported on tracks formed by holes in a pair of spaced apart electrically conductive plates. This device has a relatively high sensitivity and also by changing the construction of the bar its frequency response can be readily and easily altered. However, relatively complex analysing apparatus is still required to analyse the frequency response from the vibration sensing device so that vibrations caused by spurious sources may be discriminated against.

Another example of such a vibration sensing device is disclosed in British Pat. No. 1,263,076. This vibration sensing device comprises an electrically conducting sphere supported normally on a seat formed by three pins or legs, two of the pins or legs forming electrical contacts such that upon dislodgement of the sphere off the seat upon vibration of the switch, a circuit between the two contacts is momentarily broken. However, this device also needs relatively complex analysing apparatus to analyse the response generated by vibrations.

A further disadvantage of known vibration sensing devices is that they can only be placed in certain orientations relative to the surface on which they are placed. For example, the sensing device of British Pat. No. 1,263,076 can only be arranged with the pins vertical and accordingly it must either be provided with an adjustable mounting plate or some other means whereby it can be positioned accurately. This presents particular problems when a vibration sensing device has to be mounted to a narrow sash bar or a window or indeed a inclined sash bar of a skylight, for example. U.S. Pat. No. 4,185,180 partly overcomes this problem in that it can be mounted in any orientation in a particular plane. However, if during mounting it is inclined at an angle in such a way that the bar is not horizontal, the vibration sensing device will not operate correctly and indeed may not operate at all.

The term structure is used hereinafter in this Specification to include, buildings, machines and the like.

OBJECTS

The present invention is directed towards providing a vibration sensing device which will be responsive to vibrations of a certain pre-determined amplitude and frequency and not responsive to vibrations of certain other pre-determined frequencies and amplitudes.

A further object of the invention is to provide a vibration sensing device that can be mounted in any orientation on a surface inclined at any angle without the necessity for alternations to the device.

A still further object of the invention is to provide a vibration sensing device in which the device can readily and easily be made responsive to vibrations of different values.

Another object of the invention is to provide a vibration sensing device that is particularly suitable for frequency detection.

SUMMARY OF THE INVENTION

According to the invention there is provided a vibration sensing device for mounting on a structure, the vibration sensing device comprising:

a base member adapted for mounting on the structure, a vibration sensor, and a pendulous support for pendulously suspending the vibration sensor from the base member to eliminate from the vibration sensor the effects of certain vibrations in the structure, the pendulous support being adapted for pendulous mounting to the base member.

In one embodiment of the invention the vibration sensor comprises an electrically conductive inertia mass and a pair of spaced apart electrically conductive and mutually insulated support members to support the inertia mass, the support members forming with the inertia mass part of an electrical circuit so that on vibration of the device the inertia mass lifts off at least one support member to open the electrical circuit.

In another embodiment of the invention the pendulous support comprises a pair of spaced apart electrically conductive and mutually insulated suspension members, a pair of electrically conductive and mutually insulated pivot members for pivotally supporting the suspension members, the pivot members having a common axis and being adapted for mounting to the structure, the suspension members and pivot members forming part of the electrical circuit through the vibration sensor.

Preferably, the pivot members are of circular cross-section joined by an electrically insulating central member, the suspension members being formed by a pair of electrically conductive suspension plates, each having a pivot hole to engage a pivot member.

In a further embodiment of the invention the inertia mass is provided by an electrically conductive bar, each support member being provided on a suspension plate.

Preferably, each support member is provided by portion of a track formed by a hole in each suspension plate, the area of each hole relative to the cross-sectional area of the bar being such as to permit movement of the bar off the track.

Preferably, two bars are provided, each bar being separately supported on a pair of support members.

Alternatively, the inertia mass is provided by an electrically conductive sphere, the support members each being provided on the suspension members.

Preferably, a mounting means is provided for mounting the pendulous support to the base member so that the pendulous support is pivotal about an additional axis, both axes being substantially perpendicular to each other.

Because the vibration sensor is pendulously mounted, when the device is subjected to vibrations of energy sufficient to overcome the combined inertia of the vibration sensor and the pendulous support, the pendulous support oscillates. The oscillation of the pendulous support absorbs the energy of the vibration and accordingly the effects of these vibrations are not transmitted to the inertia mass and it thereby does not lift off the support members. Thereby, the vibration sensor is non-responsive to such vibrations.

Needless to say, when the vibration sensing device is subjected to vibrations of energy below a certain level of energy, in other words a level of energy insufficient to overcome the combined inertia of the vibration sensor and the pendulous support, the pendulous support remains stationary and the vibrations are transmitted through the support to the vibration sensor. This causes the inertia mass to lift off the support members. A frequency response is then sent from the vibration sensing device to activate an alarm.

Accordingly, the vibration sensing device according to the invention is substantially un-responsive to vibrations caused by spurious sources while it is responsive to vibrations caused by an attempted break-in to a building or structure, thereby avoiding the need for complex analysing equipment.

Because the inertia mass is provided by a bar or bars, the bars can readily and easily be replaced by other bars of different inertia. Thereby, the combined inertia of the pendulous support and the vibration sensor can readily and easily be altered so that the vibration sensing device is responsive only to frequencies of different values. Similarily, where the inertia mass is a sphere, spheres of different mass can also be used.

Furthermore, because the inertia mass is a bar supported between two spaced apart support members the vibration sensing device is particularly sensitive to the vibrations to which it is to be responsive.

Additionally, when a mounting means for mounting the pendulous support to the base member is provided, the pendulous support is pivotal about two perpendicular axes, this permits the vibration sensor to orientate itself so that the inertia mass is always sitting in the correct position on the support members irrespective of the positioning of the device on the structure and irrespective of the angle of inclination of the surface of the structure.

BRIEF DESCRIPTION OF THE DRAWINGS

The above and other objects and advantages of this invention will become apparant from the following description of some embodiments of the invention described with reference to the accompanying drawings.

Figure 1:
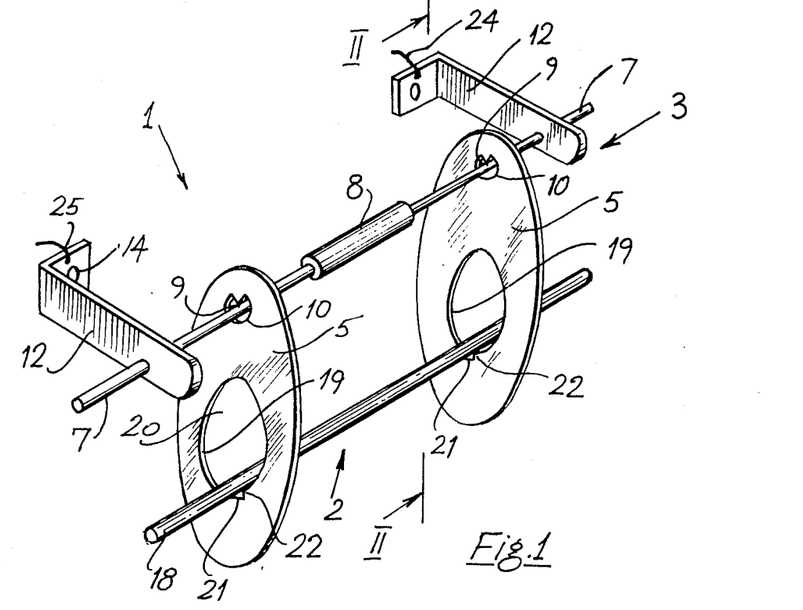
FIG. 1 is a perspective view of a vibration sensing device according to the invention.
Figure 2:
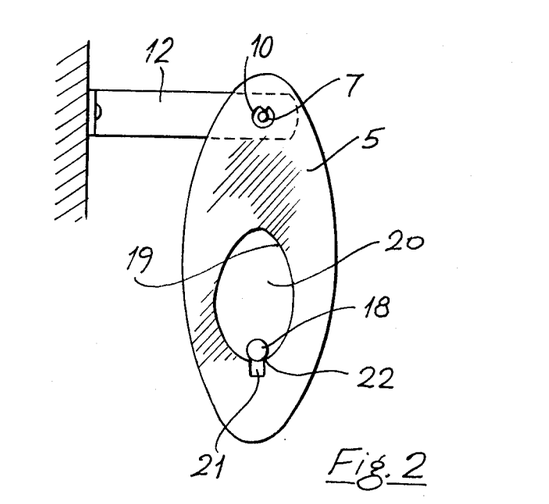
FIG. 2 is a sectional view of the vibration sensing device on the line II—II of FIG. 1.

Referring to the drawings, and initially to FIGS. 1 and 2 there is provided a vibration sensing device according to the invention indicated generally by the reference numeral 1. The vibration sensing device 1 comprises a vibration sensor 2 which forms part of an electrical circuit and will be described below. A pendulous support 3 pendulously suspends the vibration sensor 2 from a structure (not shown) by means of a suitable base member, part of which is formed by electrically conductive support brackets 12 so that the effects of certain vibrations in the structure are eliminated from the vibration sensor 2. The pendulous support 3 comprises a pair of suspension members provided by a pair of spaced apart electrically conductive and mutually insulated suspension plates 5. The plates 5 form part of the vibration sensor 2 as will be described below, and are suspended on a pair of electrically conductive pivot members 7 of circular cross-section joined by an insulating member 8. A knife edge support 9 projecting into a hole 10 in each plate 5 engages the pivot members 7. The knife edge support 9 improves electrical contact between the plates 5 and the pivot members 7. The electrically conductive support brackets 12 mount the pivot members 7 to the structure 4. Holes 14 are provided in the brackets 12 to accommodate screws (not shown).

The vibration sensor 2 comprises an electrically conductive inertia mass provided by an electrically conductive bar 18 supported on a pair of spaced apart support members provided by a portion of a track 19 formed by holes 20 in each of the suspension plates 5. It can be seen that the area of the holes relative to the cross-sectional area of the bar is such as to permit the bar to lift off the track 19. A recess 21 is provided in the lower portion of each track 19 to form a pair of knife edge supports 22 to support the bar 18. The knife edge supports 22 improve electrical contact between the bar 18 and the track 19. Accordingly an electrical circuit is provided between the brackets 12 through the pivot members 7, the plates 5 and the bar 18, which is broken when the bar 18 lifts off the track 19. Electrical cables 24 and 25 are connected to the brackets 12 to connect the vibration sensing device to a relay or suitable control apparatus (not shown).

The inertia of the plates 5 in combination with the bar 18 is sufficiently high that they do not oscilate when subjected to low energy vibrations, namely, low amplitude high frequency vibrations, for example, vibrations in the order of 1000 Hz. While at the same time, the inertia of the combination is such that high energy vibrations overcome the inertia and cause the combination to oscilate, in other words high amplitude low frequency vibrations, for example, vibrations below 100 Hz. Thus, when the device 1 is subjected to vibrations below 100 Hz. the oscillation of the plates 5 and bar 18 absorbs the energy of the vibrations and the effects of the vibrations are eliminated from the bar 18, and the electrical circuit remains closed. Needless to say, as the plates 5 and the bar 18 oscillate the bar 18 remains in contact with the track 19. However when the device 1 is subjected to vibrations in the order of 1000 Hz., the vibrations are transmitted through the plates 5 which remain stationary to the bar 18 which vibrates, thus opening and closing the electrical circuit.

In use, the vibration sensing device 1 is mounted on the structure and the cable 24 and 25 are connect to the control apparatus. When the structure is subjected to high frequency low amplitude vibrations, as already described the energy of the vibrations, are transmitted through the device to the bar 18 and the bar 18 vibrates causing the electrical circuit through the device to be opened and closed, thereby sending a signal to the control apparatus which activates an alarm. If however, the vibrations are of high amplitude and low frequency the energy of the vibrations will cause the plates 5 and bar 18 to oscillate thereby absorbing the energy of the vibrations and the effects are not transmitted to the bar 18.

Referring to FIGS. 3 to 9 there is provided a vibration sensing device 30 comprising a vibration sensor 31 pendulously suspended on a pendulous support 32. The vibration sensor 31 and the pendulous support 32 are substantially similar to those described with reference to FIGS. 1 and 2 and like parts are identified by the same reference numerals. In this embodiment of the invention the pendulous support 32 is mounted on a structure 4 by means of a mounting means 33 and a base member 34. The mounting means 33 provides an additional perpendicular pivot axis for the pendulous support 32 so that irrespective of the orientation of mounting of the device 30 to the structure 4 the vibration sensor always takes up a pre-determined position as shown in FIGS. 9a to d. The mounting means 33 will be described in detail below.

Figure 4:
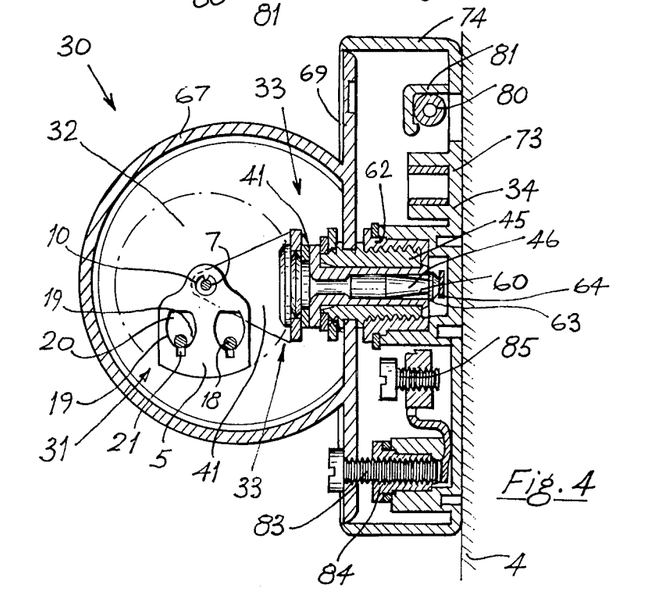
FIG. 4 is a sectional side view on the line IV—IV of the vibration sensing device of FIG. 3.
Figure 5:
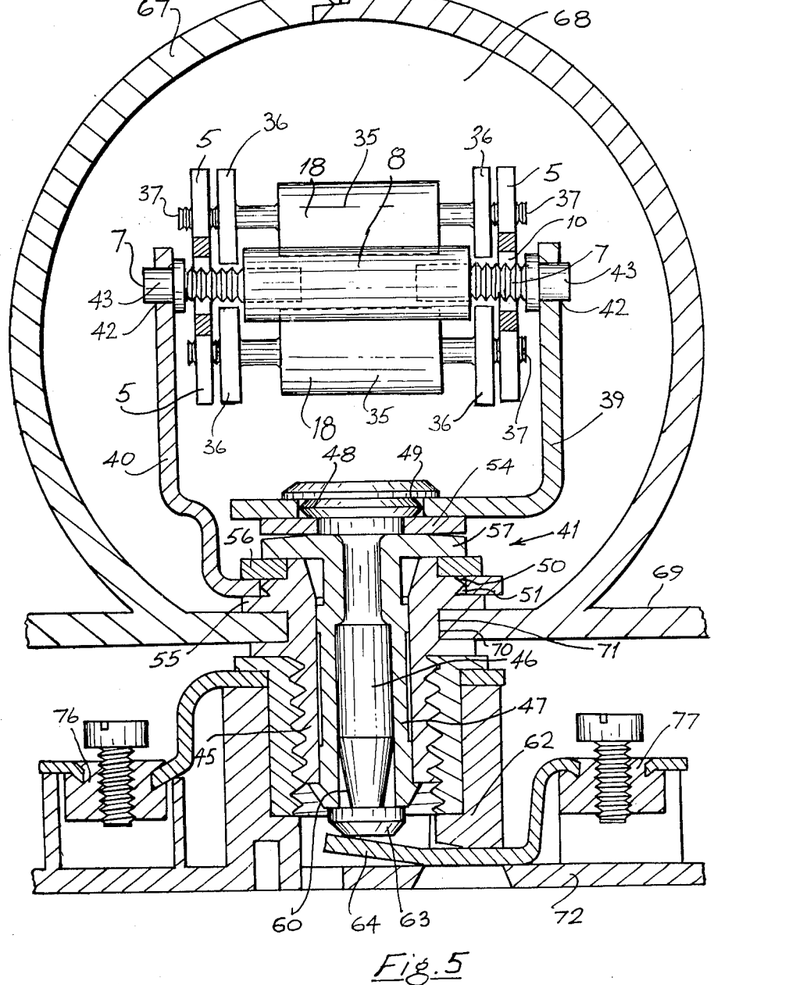
FIG. 5 is a sectional plan view on the line V—V of the vibration sensing device of FIG. 3.
Figure 6:
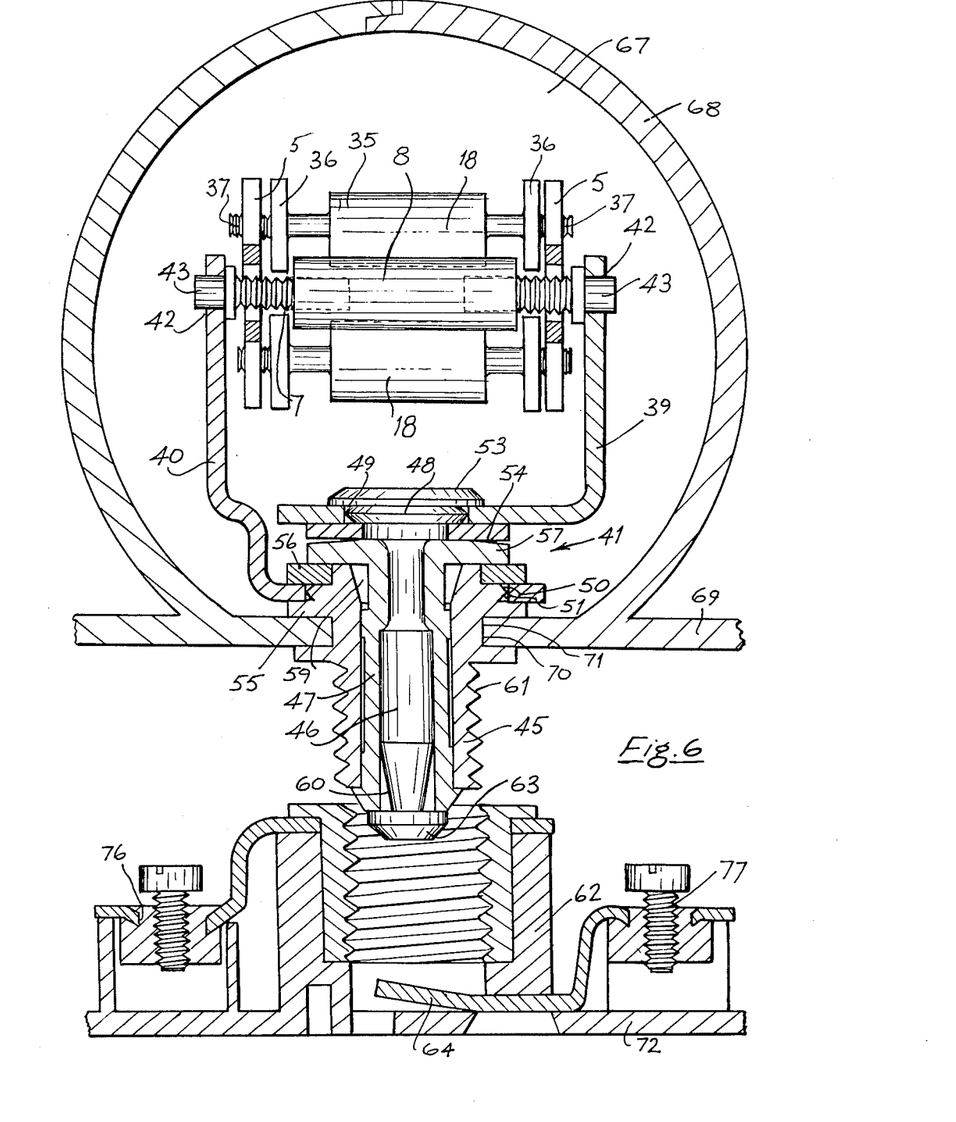
FIG. 6 is a sectional plan view of the vibration sensing device of FIG. 3 showing a base member separated from the device.

The vibration sensor 31 comprises a pair of electrically conductive bars 18 and support tracks 19 are formed by two holes in each suspension plate 5 as can most clearly be seen from FIG. 4. The use of two bars 18 in the vibration sensor 31 makes the vibration sensor less sensitive to frequencies in the lower frequency range since the use of two bars increase the combined inertia of the plates and bars while at the same time the sensitivity of the device to high frequencies is not substantially effected. Furthermore when the bars begin to vibrate it is essential for the two bars 18 to be off the knife edge supports 22 simultaneously otherwise the electrical circuit through the sensor 31 will not be broken.

Figure 3:
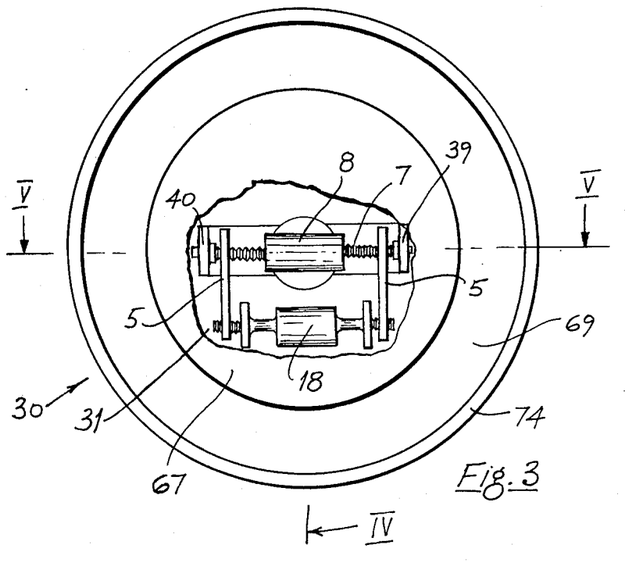
FIG. 3 is a front elevational view of a vibration sensing device according to another embodiment of the invention with portion of the device removed.

Each bar 18 is of gold plated brass and has a centre portion 35 of enlarged diameter to increase the inertia of the bar. Portions 36 also of enlarged diameter are provided on the bars 18 adjacent to the plates 5 to prevent the bars 18 from sliding through the holes 20. Electrical contact between each bar 18 and the knife edge supports 22 is increased by providing a bevelled portion 37 on the end of each bar 18. The pivot shafts 7 are similarly bevelled to provide improved electrical contact with the knife edge support 9. The insulating member 8 is provided with holes 38 which engage the pivot members 7.

The mounting means 33 includes a pair of electrically conductive and mutually insulated L-shaped brackets 39 and 40 of gold plated brass material pivotally mounted on a composite shaft 41 as will be described in detail below. Holes 42 in each bracket 39 and 40 are provided to engage ends 43 of the pivot members 7 by means of a press fit. The assembly of the L-shaped brackets and the pivot members 7 and the insulating member 8 retain the L-shaped brackets 39 and 40 to form a substantially U-shaped support for the pendulous support 32.

Figure 8:
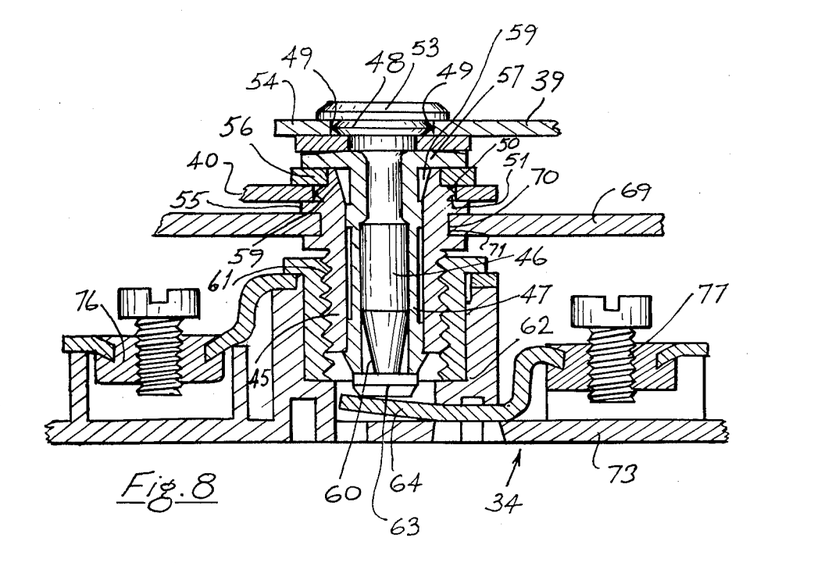
FIG. 8 is a detailed sectional view of portion of the vibration sensing device of FIG. 3, FIG. 9a to d show the vibration sensing device of FIG. 3 mounted in different position.
Figures 9A, 9B, 9C, 9D:
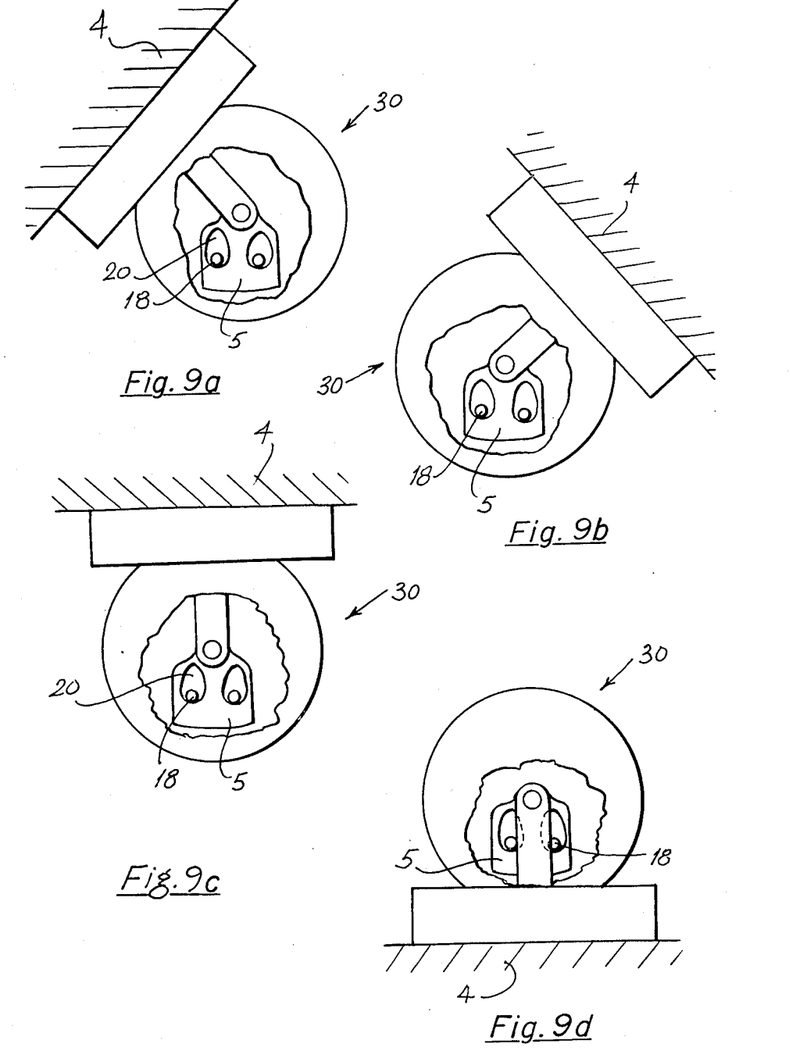

The composite shaft 41 comprises an electrically conductive outer pivot shaft 45 and an electrically conductive co-axial inner pivot shaft 46. The shafts 45 and 46 are of gold plated brass material and mutually insulated by an insulating sleeve of plastics material 47. A bevelled track 48 is provided at the end of the inner shaft 46 to pivotally engage a hole 49 in the L-shaped bracket 39. A similar bevelled track 50 is provided on the outer shaft to pivotally engage a hole 51 in the bracket 40. It will be appreciated that the fact that the tracks 48 and 50 are bevelled electrical contact between the shafts and the brackets is improved. A flange 53 at the end of the inner shaft and a washer 54 retain the bracket 39 on the shaft 46. A flange 55 and a washer 56 similarly retain the bracket 40 on the track 50. The washers 54 and 56 are separated by a flange 57 on the sleeve 47. A tappered lead-in 59 to the bore of the outer shaft 45 is provided to facilitate assembly of the inner shaft 46 and the outer shaft 45. The inner shaft 46 also has a reduced portion 60 similarly to facilitate assembly of the two shafts.

A screw thread 61 is provided on the outer shaft 45 which engages a correspondingly threaded electrical socket 62 in the base member 34. An electrical contact flange 63 is provided on the end of the inner shaft 46 to engage an electrical contact 64 in the electrical socket 62. Thereby, the electrical circuit through the vibration sensing device can be connected into suitable control apparatus from the socket 62 and the contact 64. This enables the vibration sensing device to be readily and easily disconnected from the base member 34, merely by unscrewing the outer shaft 45 from the socket 62. Accordingly, the vibration sensing device can readily and easily be replaced and with suitable testing apparatus the device can similarly be screwed into a test socket and necessary tests carried out on it.

The vibration sensing device is housed in a substantially spherical housing 67 formed by two hemispheres 68 of moulded plastics material. The hemispheres terminate in plate members 69 integrally moulded with the hemispheres 68. The plate member 69 when assembled form a opening 70 which engages an annular recess 71 in the outer pivot shaft 45. The plate 69 forms a cover for the base member 34. The base member 34 comprises a base plate 73 with an integrally moulded upstanding cylindrical wall 74.

Figure 7:
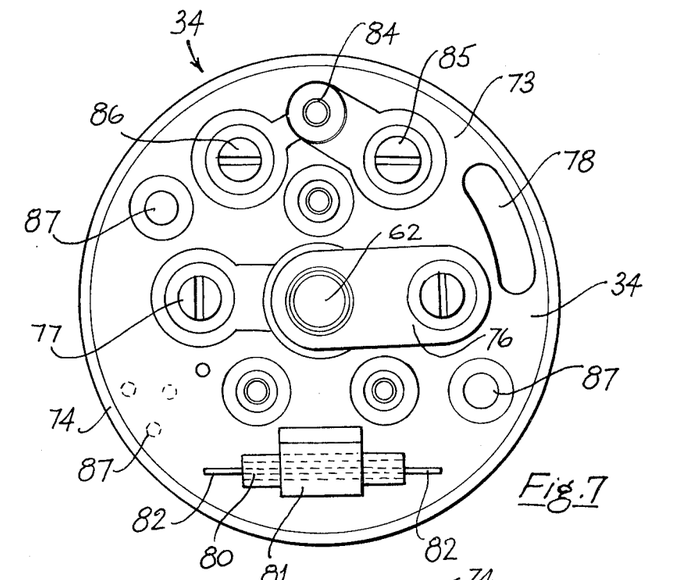
FIG. 7 is a plan view of the base member of the vibration sensing device of FIG. 3.

Cable connectors 76 and 77 connected respectively to the socket 62 and the inner contact 64 are provided in the base member 34 for connection to cables (not shown) from control apparatus (also not shown) see FIG. 7. A cable entry 78 is also provided in the base plate 73. A magnetic reed switch 80 mounted in an integrally moulded bracket 81 is provided in the base member. Contacts 82 are provided to connect the reed switch 80 to the control apparatus. An electrically conductive locking screw 83 is provided to lock the plate 69 in position in the base member 34, see FIG. 4. The screw 83 engages a threaded socket 84 in the base member (see FIG. 7) and makes electrical contact between a pair of electrical connectors 85 and 86. Thereby, to remove the vibration sensing device 30 from the base member 34, the screw 83 must be removed from the socket 84, thus opening the circuit between the connectors 85 and 86. The connectors 85 and 86 can be connected to the control apparatus to trigger an alarm if an attempt is made to tamper with the device 30. Mounting holes 87 are provided in the base plate 74 for mounting the base member 34 to the structure.

In use the base member 34 is mounted to the structure 4. The electrical connectors 76, 77, 82, 85 and 86 are connected to the control apparatus. The vibration sensing device 30 is then secured to the base member 34 by engaging the outer pivot shaft 45 in the socket 62. The locking screw 83 is then secured in the threaded socket 84. Because the vibration sensor is pendulously suspended from the pivot members 7 and the pivot members 7 in turn are pivotal about the axis of the pivot shafts 45 and 46 effectively forming a gimbal mounting, the vibration sensor 31 orients itself so that the suspension plates suspend the bars 18 as can most clearly be seen in FIGS. 3 and 4. On being subjected to high amplitude low frequency vibrations, for example, vibrations of frequencies in the order of 100 Hz., the energy of these vibrations is sufficient to overcome the combined inertia of the plates 5 and the bars 18 and accordingly the plates 5 oscillate. This eliminates the effects of vibrations from the bars 18, and the bars 18 do not vibrate. However, if the structure 4 is subjected to high frequency low amplitude vibrations, for example, the type caused by chiseling or cutting of glass, for example, a burglar breaking into a building, the energy of these vibrations is insufficient to overcome the combined inertia of the plates 5 and the bars 18 and accordingly, the plates 5 remain stationary. Thus the energy of the vibrations is transferred directly through the plates into the bars 18 which begin to vibrate. The vibration of the bars cause the electrical circuit through the vibration sensing device to open and close, thereby a response is sent to the control apparatus to trigger an alarm.

Accordingly, it will be appreciated that only those vibrations in the structure 4 caused by an intruder attempting to break into a building, namely, low amplitude high frequency vibrations cause the bars 18 to lift off the supports 22 which in turn activates the alarm. The effects of spurious vibrations caused by, for example, birds flying against a window or the like are eliminated from the vibration sensor by virtue of the fact that the suspension plates 5 and the bars 18 oscillate, thereby absorbing the energy of vibrations and isolating the vibration sensor from the effects of these vibrations.

One particular advantage of this particular embodiment of the invention is the fact that because of the mounting arrangement of the vibration sensing device 30 to the base member 34, a faulty vibration sensing device can readily and easily be replaced.

Furthermore because the mounting means 33 and the pendulous support 32 permit the vibration sensor 31 to pivot through 360° in two perpendicular planes, the vibration sensor 31 always takes up the same orientation irrespective of the angle of mounting of the device. FIGS. 9a to d show examples of some typical mounting angles.

FIGS. 10a to c and 11a to h show various configurations of bars 18 and holes 20 which may be used. These are just a sample of suitable combinations and are by no means exhaustive. Other suitable configurations of bars 18 and holes 20 will be readily apparent to those skilled in the art.

Figures 10A, 12, 13:
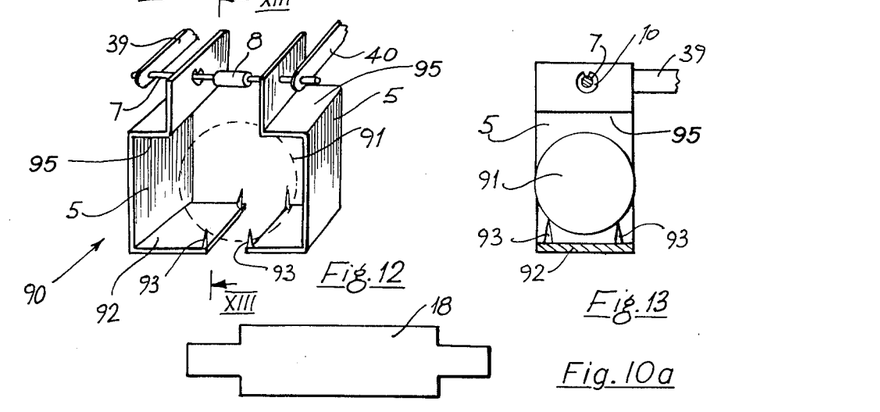
FIGS. 10a to c show other shapes of bars which may be used in the vibration sensing device shown in FIGS. 1 to 9, FIGS. 11a to h show other shapes of bars and holes which may be used in the vibration sensing device of FIGS. 1 to 9.
FIG. 12 is a perspective view of a portion of a vibration sensing device according to another embodiment of the invention.
FIG. 13 is a sectional side view on the line XIII—XIII of the vibration sensing device of FIG. 12.
Figure 10B:
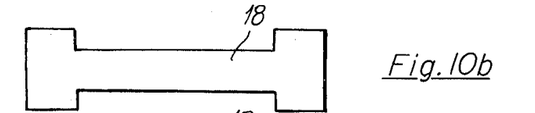
Figure 10C:
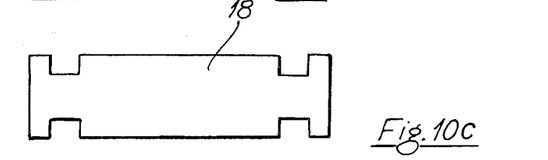
Figure 11A:
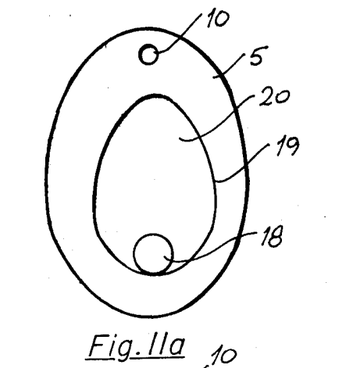
Figure 11B:
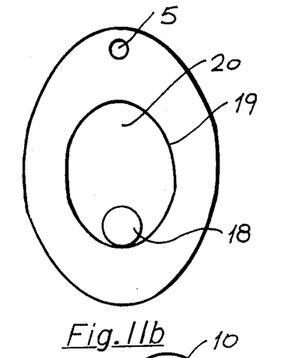
Figures 11C, 11D, 11E, 11F, 11G, 11H:
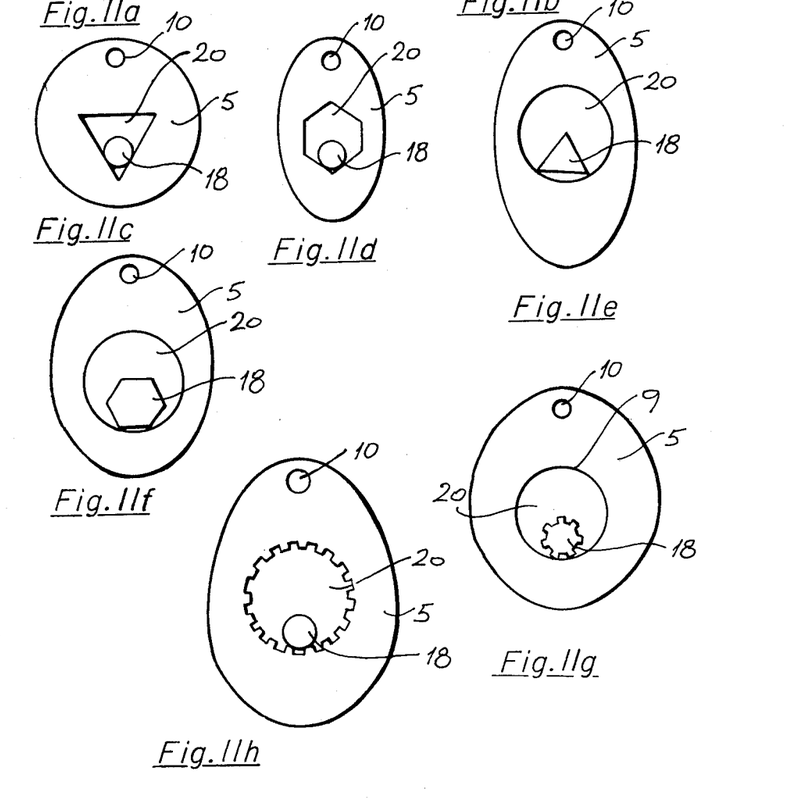

FIGS. 12 and 13 show another type of vibration sensor 90 which may be mounted in the vibration sensing device according to the invention. The drawings show portion of the vibration sensing device and parts similar to those described with reference to the earlier figures are represented by the same reference numerals. In this embodiment of the invention the vibration sensor effectively comprises an inertia mass formed by an electrically conductive sphere of gold plated brass material supported on a pair of electrically conductive spaced apart support members 91. The support members 91 are formed by inwardly bending the lower portions of the suspension plates 5. A pair of upstanding supports 93 are provided on each support 92 to support the sphere 91. The supports 93 terminate in a point to improve electrical contact with the sphere 91. A stop means to prevent the sphere rising off the supports 93 sufficiently to become dislodged is provided by portions 95 of the plates 5 which are cranked inwardly above the sphere.

The operation of this device is substantially similar to the operation of the devices just described. The combined inertia of the sphere 91 and the plates 5 is sufficient to enable high amplitude low frequency vibrations to cause the plates 5 and the sphere 91 to oscillate thereby eliminating the effects of vibrations from the sphere 91. While at the same time high frequency low amplitude vibrations will not cause the plates and sphere to oscillate, and accordingly the energy of the vibrations is transmitted directly through the plates into the sphere 91, which in turn vibrates, thereby opening the electrical circuit through the vibration sensing device.

Figure 14:
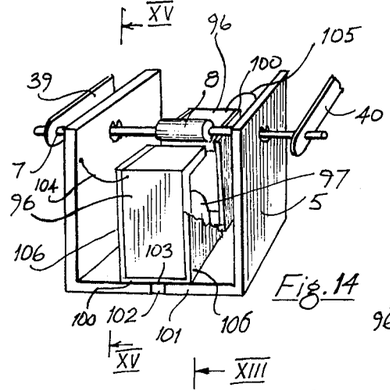
FIG. 14 is a perspective view of a further embodiment of a vibration sensing device according to the invention.
Figure 15:
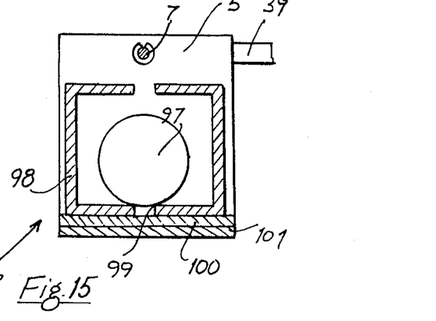
FIG. 15 is a sectional side view on the line XV—XV of the vibration sensing device of FIG. 14.

FIGS. 14 and 15 show portion of another vibration sensing device according to a still further embodiment of the invention. This vibration sensing device is substantially similar to those already described and like parts are identified by the same reference numerals. A vibrations sensor 96 of this device comprises an inertia mass provided by an electrically conductive short bar provided by a gold plated brass disc 97 supported longitudinally between a pair of channel members 98 and supported on edges 99 of the members 98.

The members 98 are of electrically conductive gold plated brass and are mutually insulated from each other. They are mounted on a insulating base member 100 which is in turn supported on inwardly directed portions 101 of the suspension plates 5. The plates 5 in this embodiment of the invention are joined at 102 by an insulating strip 103. Electrically insulating plates 106 are provided at the ends of the channels to retain the disc in position. A light electrical cable 104 connects one of the members 98 to a suspension plate 5 while the other member 98 is connected by a cable 105 to the other plate 5. Thereby, completing the electrical circuit through the vibration sensing device.

Again, the operation of this device is substantially similar to those already described. On being subjected to high frequency low amplitude vibrations the disc 97 vibrates off the edges 99 of the channel members 98 thereby opening the electrical circuit. While when the device is subjected to vibrations of high amplitude low frequency the vibration sensor 96 and the suspension plates 5 oscillate together thereby absorbing the energy of vibrations and isolating the disc 97 from the effects of those low frequency high amplitude vibrations.

Needless to say, although the vibrations sensing device has been described having particular types of vibration sensors any other type of vibration sensor could have been used. It is envisaged for example, that the vibration sensor disclosed in German Pat. No. 2828202 could be used.

Indeed a vibration sensor of the type having two electrical conductive members movable relative to each other could be used.

It will also be appreciated that material other than brass could have been used for the electrical conducting components for example silver, copper, steel and the like. Needless to say, while preferable it is not necessary that the components should be gold plated.

Although the suspension members of the pendulous mounting means have been described as being suspension plates, it will be appreciated that it is not necessary that they are plates. For example, they could be spaced apart L-shaped suspension bars, the inertia mass being supported on the lower limb of the bar. Furthermore, it will be appreciated that two suspension members are not necessary. In fact, one suspension member could be used, in which case light weight cables could be connected to the support members of the vibration sensor to form part of the electrical circuit through the device.

It will also be appreciated that although some of the vibration sensing devices have been described as incorporating a magnetic reed switch, the reed switch is not necessary to the invention.

It will also be appreciated that it is not necessary for the vibration sensing devices to be mounted on the mounting means 33.

I claim:
1. A vibration sensing device for mounting on a structure, the vibration sensing device comprising:
   a base member adapted for mounting on the structure,
   a vibration sensor comprising an electrically conductive support member and an electrically conductive inertia mass supported on the support member, the support member forming with the inertia mass part of an electrical circuit so that on vibration of the device the inertia mass lifts off the support member to open the electrical circuit, and
   a pendulous support extending from the support member of the vibration sensor for pendulously suspending the vibration sensor from the base member to eliminate from the vibration sensor the effects of vibrations of a certain frequency range in the structure, the pendulous support being adapted for pendulous mounting to the base member.

2. A vibration sensing device as claimed in claim 1 in which the vibration sensor comprises a pair of spaced apart electrically conductive and mutually insulated support members forming with the inertia mass part of the electrical circuit.

3. A vibration sensing device as claimed in claim 2 in which the pendulous support comprises a pair of spaced apart electrically conductive and mutually insulated suspension members, one suspension member extending from each support member, and a pair of electrically conductive mutually insulated pivot members for pivotally supporting the suspension members, the pivot members having a common axis and being adapted for mounting to the structure, the suspension members and pivot members forming part of the electrical circuit through the vibration sensor.

4. A vibration sensing device for mounting on a structure, the vibration sensing device comprising:
   a base member adapted for mounting on the structure,
   a vibration sensor comprising a pair of spaced apart electrically conductive and mutually insulated support members, and an electrically conductive inertia mass supported on the support members, the support members forming with the inertial mass part of an electrical circuit so that on vibration of the device the inertia mass lifts off at least one of the support members to open an electrical circuit, and a pendulous support for pendulously suspending the vibration sensor from the base member to eliminate from the vibration sensor the effects of certain vibrations in the structure, the pendulous support comprising a pair of spaced apart electrically conductive and mutually insulated suspension members, one suspension member extending from each support member, and a pair of electrically conductive and mutually insulated pivot members for pivotally supporting the suspension members, the pivot members having a common axis and being adapted for mounting on the base member, the suspension member and pivot member forming part of the electrical circuit through the vibration sensor.

5. A vibration sensing device as claimed in claim 4 in which the pivot members are of circular cross section joined by an electrically insulating central member, the suspension members being formed by a pair of electrically conductive suspension plates, each having a pivot hole to engage a pivot member.

6. A vibration sensing device as claimed in claim 5 in which the inertia mass is provided by an electrically conductive bar, each support member being provided on a suspension plate.

7. A vibration sensing device as claimed in claim 6 in which each support member is provided by portion of a track formed by a hole in each suspension plate, the area of each hole relative to the cross-sectional area of the bar being such as to permit movement of the bar off the track.

8. A vibration sensing device as claimed in claim 7 in which a recess is provided in each track to form with each track a pair of knife edge supports to support the bar.

9. A vibration sensing device as claimed in claim 8 in which two bars are provided, each bar being separately supported on a pair of tracks.

10. A vibration sensing device as claimed in claim 9 in which the portion of the bar which rests on the support members is provided with a bevelled surface to increase electrical contact between the bar and the support members.

11. A vibration sensing device as claimed in claim 10 in which the cross-sectional area of the bar at two portions intermediate and adjacent the support members is greater than the cross-sectional area of the bar at the support members.

12. A vibration sensing device as claimed in claim 11 in which the cross-sectional area of the central portion of the bar is greater than its adjacent cross-sectional areas.

13. A vibration sensing device as claimed in claim 6 in which two bars are provided, each bar being separately supported on a pair of support members.

14. A vibration sensing device as claimed in claim 13 in which a mounting means is provided for mounting the pendulous support to the base member so that the pendulous support is pivotal about an additional axis, both axes being substantially perpendicular to each other.

15. A vibration sensing device as claimed in claim 14 in which the mounting means comprises a composite shaft having a pair of co-axial electrically conductive and mutually insulated pivot shafts, one end of the composite shaft being adapted for mounting to the base member, and the other end of the composite shaft pivotally supporting a pair of electrically conductive and mutually insulated L-shaped brackets to form a U-shaped support, one bracket being pivotal on the outer pivot shaft and the other bracket being pivotal on the inner shaft, the free legs of the brackets being retained substantially parallel to each other and projecting away from the composite shaft and parallel to the shaft axis, the pivot members projecting inwardly from the free legs of the U-shaped support.

16. A vibration sensing device as claimed in claim 6 in which each bar is symmetrical in cross-section.

17. A vibration sensing device as claimed in claim 6 in which the bar is of circular cross-section.

18. A vibration sensing device as claimed in claim 6 in which the cross-section of the bar is of polygonal shape.

19. A vibration sensing device as claimed in claim 5 in which the inertia mass is provided by an electrically conductive sphere, the support members each being provided on the suspension members.

20. A vibration sensing device as claimed in claim 19 in which the suspension members are suspension plates, the support members projecting inwardly towards each other from each of the suspension plates.

21. A vibration sensing device as claimed in claim 20 in which a pair of spaced apart support pins project upwardly from each support member, each support pin terminating in a point to support the sphere.

22. A vibration sensing device as claimed in claim 21 in which a stop means is provided above the sphere to prevent excessive upward movement of the sphere.

23. A vibration sensing device as claimed in claim 5 in which the inertia mass is an electrically conductive bar supported longitudinally by the support members.

24. A vibration sensing device as claimed in claim 23 in which the axis of the bar is parallel to the axis of the pivot members.

25. A vibration sensing device as claimed in claim 23 in which the suspension members are suspension plates joined at their lower ends by an electrically insulating member, the support members being mounted on the insulating member, each support member being electrically connected to a corresponding suspension plate.

26. A vibration sensing device as claimed in claim 25 in which the support members are provided by the lower edges of a pair of spaced apart opposing channel members defining a substantially box section, the bar being of disc like construction being retained within the channel members by electrically insulating plates at the ends of the channel members.

27. A vibration sensing device as claimed in claim 4 in which a mounting means is provided for mounting the pendulous support to the base member so that the pendulous support is pivotal about an additional axis, both axes being substantially perpendicular to each other.

28. A vibration sensing device as claimed in claim 27 in which the outer pivot shaft is threaded to engage a threaded electrically conductive socket in the base member, a further electrical contact being provided in the socket to electrically engage the inner shaft, the base member being adapted for mounting to the structure.

29. A vibration sensing device as claimed in any one of claims 3 to 28 in which the surface of each pivot member is bevelled to increase electrical contact between the pivot members and the suspension member.

* * * * *